United States Patent [19]
Endo et al.

[11] Patent Number: 5,300,343
[45] Date of Patent: Apr. 5, 1994

[54] MAGNETIC RECORDING MEDIUM IN THE FORM OF A FLOPPY DISC HAVING A MAGNETIC LAYER WITH A SPECIFIED SURFACE FEATURE

[75] Inventors: Yasushi Endo; Kunihiko Sano, both of Kanagawa, Japan; Mikihiko Kato, Brookline, Mass.

[73] Assignee: Fuji Photo Film Co., Ltd., Kanagawa, Japan

[21] Appl. No.: 619,531

[22] Filed: Nov. 29, 1990

[30] Foreign Application Priority Data

Nov. 29, 1989 [JP] Japan ................. 1-309913

[51] Int. Cl.$^5$ ............................. G11B 5/00
[52] U.S. Cl. ............................ 428/64; 428/65; 428/328; 428/402; 428/409; 428/424.6; 428/522; 428/694 BG; 428/694 BR; 428/694 BA; 428/900
[58] Field of Search ........... 428/64, 65, 323, 328, 428/329, 402, 409, 424.6, 425.8, 425.9, 522, 694, 900, 694 BG, 694 BR, 694 BA

[56] References Cited

U.S. PATENT DOCUMENTS

| | | | |
|---|---|---|---|
| 4,594,174 | 6/1986 | Nakayama et al. | 252/62.54 |
| 4,791,021 | 12/1988 | Honda et al. | 428/329 |
| 4,851,288 | 7/1989 | Ishikuro et al. | 428/329 |
| 4,863,793 | 9/1989 | Ogawa et al. | 428/323 |
| 4,888,212 | 12/1989 | Iida et al. | 427/130 |
| 4,904,530 | 2/1990 | Huizing et al. | 428/402 |
| 4,959,263 | 9/1990 | Aonuma et al. | 428/329 |
| 5,093,191 | 3/1992 | Sano et al. | 428/323 |
| 5,096,774 | 3/1992 | Sano et al. | 428/323 |

*Primary Examiner*—Stevan A. Resan
*Attorney, Agent, or Firm*—Sughrue, Mion, Zinn, Macpeak & Seas

[57] ABSTRACT

A novel magnetic disc and process for the preparation thereof is disclosed, comprising a nonmagnetic support having thereon a magnetic layer comprising ferromagnetic metal particles and a binder resin containing at least a vinyl chloride copolymer, wherein the crystallite size of the ferromagnetic metal particles as determined by X-ray diffraction method is 300 Å or less, and the ratio $\alpha$ at the surface of the magnetic layer of the integrated intensity of the Cl-2P spectrum as determined by X-ray photoelectron spectroscopy to that of the Fe-2P(3/2) spectrum is in the range of from 0.50 to 0.90. In a preferred embodiment, the vinyl chloride copolymer contains at least one polar group selected from the group consisting of $-SO_3M$, $-OSO_3M$, $-PO_3M_2$, and $-CO_2M$ wherein M represents hydrogen, an alkali metal or ammonium and at least one epoxy ring in the copolymer molecule.

11 Claims, No Drawings

MAGNETIC RECORDING MEDIUM IN THE FORM OF A FLOPPY DISC HAVING A MAGNETIC LAYER WITH A SPECIFIED SURFACE FEATURE

FIELD OF THE INVENTION

The present invention relates to a magnetic disc and process for preparation thereof. More particularly, the present invention relates to a coating type magnetic disc comprising ferromagnetic metal particles which exhibits excellent running durability.

BACKGROUND OF THE INVENTION

In a coating type magnetic recording medium having a magnetic layer mainly comprising ferromagnetic particles and a binder resin, there is an increased demand for higher density recording. Smoothing of the surface of the magnetic layer is a known technique for providing higher density recording.

However, an enhanced surface smoothness of the magnetic layer causes a rise in the coefficient of friction between the magnetic layer of the running magnetic recording medium and the apparatus system in contact therewith. Damage to the magnetic layer or peeling of the magnetic layer can thereby result in a relatively short period of use.

Floppy discs, in particular, are often used under sever high-temperature conditions such as in durability tests. In such cases, the magnetic layers tend to shed ferromagnetic particles, which may clog the magnetic head.

Furthermore, as an effective means for providing higher density magnetic recording media, ferromagnetic metal particles may be employed.

The use of ferromagnetic metal particles in a floppy disc, however, is disadvantageous in that the magnetic layer tends to become damaged due to the rubbing contact of the magnetic layer with the jacket liner to thereby result in dropout, as opposed to the case where iron oxides are used. This problem is often encountered particularly when floppy discs are used under conditions of relatively high temperature such as 50° to 60° C., or when the temperature periodically fluctuates between low and high values.

For improving the running durability of the magnetic layer, it has been proposed to incorporate an aliphatic acid or an ester of an aliphatic acid and aliphatic alcohol as a lubricant in the magnetic layer to reduce the coefficient of friction thereof with the recording apparatus.

For example, it has been proposed to incorporate a monobasic aliphatic acid having 4 or more carbon atoms such as capric acid, lauric acid and oleic acid as a lubricant in the magnetic layer as disclosed in U.S. Pat. No. 3,833,412. It has also been proposed to incorporate an aliphatic ester of a monobasic aliphatic acid having 12 to 16 carbon atoms such as butyl laurate, lauryl palmitate and butyl myristate and aliphatic alcohol having 3 to 12 carbon atoms as a lubricant in the magnetic layer as disclosed in U.S. Pat. No. 3,274,111. It has further been proposed to incorporate tridecyl stearate as a lubricant in the magnetic layer as disclosed in U.S. Pat. No. 4,303,738.

Moreover, it has been proposed to incorporate a higher aliphatic ester of a higher alcohol having a branched molecular structure as a lubricant in the magnetic layer as disclosed in JP-A-55-157131 (the term "JP-A" as used herein means an "unexamined published Japanese patent application"). Furthermore it has been proposed to incorporate isocetyl stearate as a lubricant in the magnetic layer as disclosed in JP-A-59-186130.

The incorporation of the above described lubricants adversely affects the strength of the magnetic layer, although the use thereof is effective in lowering the coefficient of friction. Therefore, the use of the above described lubricants alone does not prevent the magnetic layer from being damaged by contact with the jacket liner.

Moreover, use of a cellulosic resin as a binder resin having a high modulus of elasticity and excellent mechanical strength to thereby improve the linear-abrasion resistance of the magnetic layer is disclosed, for example, in JP-A-56-13519, 62-239316, 58-70424, 58-70425, 56-74833, 60-133527, 62-34326, 62-26628, 59-79428, 57-135439, 56-74832, and 59-188827.

Binder resins based on conventional cellulosic resins including nitrocellulose, however, do not adequately disperse the ferromagnetic particles, such that not only does the resulting magnetic layer have a poor surface property, but the packing density of the ferromagnetic particles cannot be increased to the desired extent. Consequently, the use of conventional cellulosic resins has been ineffective in providing a magnetic recording media having excellent electromagnetic characteristics.

Furthermore, it has been proposed to use a phenoxy resin as a binder resin as disclosed in JP-A-1-106325, 64-39623, 57-36647, and 57-36648. However, even this approach does not adequately improve the running durability of magnetic layer of a magnetic recording medium comprising a ferromagnetic metal powder with respect to the liner of the jacket of a floppy disc.

Moreover, it has been proposed in U.S. Pat. No. 4,740,418 and JP-B-55-15771 to incorporate an abrasive agent (e.g., hard particles), such as corundum, silicon carbide and chromium oxide in the magnetic layer. The term "JP-B" as used herein means an "examined Japanese patent publication". However, this approach does not protect the magnetic layer from being damaged by the liner of the jacket.

SUMMARY OF THE INVENTION

An object of the present invention is to provide a magnetic disc and process for preparation thereof having excellent electromagnetic characteristics as well as good running durability, and that is well adapted for use as a floppy disc.

The above and other objects of the present invention will become apparent from the following detailed description and examples.

The above object of the present invention is accomplished by providing a magnetic disc comprising a nonmagnetic support having thereon a magnetic layer comprising ferromagnetic metal particles and a binder resin containing at least a vinyl chloride copolymer, wherein the crystallite size of the ferromagnetic metal particles as determined by X-ray diffraction method is 300 Å or less, and the ratio α at the surface of the magnetic layer of the integrated intensity of the Cl-2P spectrum as determined by X-ray photoelectron spectroscopy to that of the Fe-2P(3/2) spectrum in the range of from 0.50 to 0.90.

The above object of the present invention is also accomplished by providing a process for conditioning a magnetic layer provided on a nonmagnetic support of a magnetic disc, said magnetic layer comprising ferromagnetic metal particles and a binder resin containing at least a vinyl chloride copolymer, said ferromagnetic metal particles having a crystallite size of 300 Å or less as determined by X-ray diffraction method, comprising the steps of polishing the surface of the magnetic layer with polishing means for a period of time and applied pressure necessary to provide a ratio α at the surface of the magnetic layer of the integrated intensity of the Cl-2P spectrum as determined by X-ray photoelectron spectroscopy to that of the Fe-2P(3/2) spectrum in the range of from 0.50 to 0.90.

DETAILED DESCRIPTION OF THE INVENTION

The magnetic disc of the present invention comprises ferromagnetic metal particles having a small crystallite particle size of 300 Å or less as determined by X-ray diffraction method, to thereby provide high resolving power and excellent electromagnetic characteristics.

Furthermore, the magnetic disc of the present invention comprises a vinyl chloride resin as a binder resin to provide a magnetic layer having good physical film properties.

In the magnetic disc of the present invention, the ratio of the binder resin present on the surface of the magnetic layer to the ferromagnetic metal particles present on the surface of the magnetic layer is selected to improve the strength of the magnetic layer. Thus, the magnetic disc of the present invention exhibits excellent running durability. In particular, the ratio of the integrated intensity of the Cl-2P spectrum as determined by X-ray photoelectron spectroscopy, which measurement is used herein to determine the content of the binder resin, to the integrated intensity of the Fe-2P(3/2) spectrum, which measurement is used herein to determine the content of the ferromagnetic metal particles, is selected to provide excellent running durability under severe environmental conditions and to minimize damage to the magnetic layer by the jacket liner, particularly when the magnetic disc is used as a floppy disc. The Cl-2P spectrum originates from the vinyl chloride copolymer contained in the binder resin of the present invention, while the Fe-2P(3/2) spectrum originates from the ferromagnetic metal particles. In the magnetic recording medium of the present invention, the content of the vinyl chloride copolymer in the binder resin, and the Fe atom content of the ferromagnetic metal particles are not particularly limited. The ratio α of the integrated intensity of Cl-2P spectrum as determined by X-ray photoelectron spectroscopy to that of Fe-2P(3/2) spectrum determined in the same manner is in the range of from 0.5 to 0.9, and preferably from 0.53 to 0.87.

The crystallite size is a value obtained by the calculation according to Sheller's equation on the basis of the half value width of the peak of diffraction of the (110) plane and (220) plane of α-Fe in a ferromagnetic metal powder mainly comprising Fe as determined by ordinary X-ray diffraction method.

The integrated intensity of the spectrum of the Cl atom and Fe atom at the surface of the magnetic layer as determined by X-ray photoelectron spectroscopy is obtained by integrating the intensity of the spectrum measured for a predetermined period of time from a magnetic disc specimen set in an X-ray photoelectron spectroscope with a Mg anode as an X-ray source with reference to Thomas A. Carlson, *Photoelectron and Auger Spectroscopy*, page 3, PLENUM PRESS NEW YORK and LONDON (1975). The specimen is prepared prior to analysis by washing the lubricant away from the surface of the magnetic layer of the magnetic disc.

In the magnetic recording medium of the present invention comprising a magnetic layer comprising a vinyl chloride copolymer as a component of the binder resin and ferromagnetic metal particles mainly composed of iron, the chlorine atom content and the iron atom content at the surface of the magnetic layer is effectively controlled to achieve the objectives of the present invention. In particular, when the magnetic recording medium of the present invention is used as a floppy disc, a magnetic recording medium is obtained having a magnetic layer which is not damaged by the jacket liner.

The reason why the running durability is effectively improved by controlling the proportion of the chlorine atom content to that of iron atom at the surface of the magnetic layer to a predetermined range in accordance with the present invention is unknown. The analysis of substances adhered to the jacket liner on which the magnetic recording medium has been run as a floppy disc indicates that these adhered substances are mostly binder components. Furthermore, if the binder resin comprises a vinyl chloride copolymer, the content of the vinyl chloride copolymer in the binder resin and the proportion of the ferromagnetic metal particles to the binder resin are not too related. There is a relationship between the content of chlorine atom contained in the adhered substances and the damage to the magnetic layer. It is therefore considered that the content of the vinyl chloride copolymer at the surface of the magnetic layer effects the running durability of the magnetic disc.

The preparation of the magnetic disc of the present invention can be accomplished by various methods as described in JP-A-61-136764, JP-A-63-259830, JP-A-63-98834, and JP-A-63-98832. In particular, the magnetic layer is preferably polished using polishing means by applying a grinder or lapping tape against the surface thereof. The reason why this technique is effective in obtaining a magnetic recording medium of the present invention is not certain. It is considered that the polishing removes from the surface of the magnetic layer substances which are readily adhered to the jacket liner of a floppy disc.

As the surface of the magnetic layer is polished with a grinder or lapping tape, the ratio α of the integrated intensity of the Cl-2P spectrum to that of the Fe-2P(3/2) spectrum gradually decreases to provide a ratio of from 0.5 to 0.9. However, if the polishing is conducted to an excessive extent, the ratio α of the integrated intensity of the Cl-2P spectrum to that of the Fe-2P(3/2) spectrum falls below 0.5. It is therefore required to appropriately control the time and applied pressure of the grinder or lapping tape against the magnetic layer in order to maintain the ratio α within a range of from 0.5 to 0.9. The applied pressure of the grinder or lapping tape is preferably from 0.1 to 8 kg/cm$^2$ and more preferably from 0.5 to 3 kg/cm$^2$. The time is preferably from 0.3 to 8 seconds and more preferably from 0.5 to 5 seconds.

The crystallite size of the ferromagnetic metal particles to be incorporated into the magnetic recording medium of the present invention as determined by X-ray diffraction method is 300 Å or less, preferably from 180 to 280 Å.

If the crystallite size exceeds 300 Å, the electromagnetic characteristics, especially the resolving power is deteriorated.

The specific surface area of the ferromagnetic metal particles is preferably 40 m²/g or more. If the specific surface area is less than 40 m²/g, the electromagnetic characteristics of the ferromagnetic metal particles, such as output, is disadvantageously affected.

The ferromagnetic metal particles contain at least Fe. The ferromagnetic metal particles for use in the present invention include particles comprising elemental metals, or an alloy such as Fe, Fe-Cr, Fe-Ni or Fe-Ni-Co. In order to enhance the properties thereof, the ferromagnetic metal particles may comprise a non-metal such as B, C, Al, Si and P.

Generally, the surface of the ferromagnetic metal particles is covered with a layer of oxide in order to improve the stability.

The acicular ratio of the ferromagnetic metal particles is preferably 5 or more. The coercive force is preferably 800 Oe or more, and the saturation magnetization is preferably 110 emu/g or more.

When the surface of the magnetic layer in the magnetic recording medium of the present invention is examined by X-ray photoelectron spectroscopy, the ratio $\alpha$ of the integrated intensity of Cl-2P spectrum to that of Fe-2P(3/2) spectrum is in the range of 0.5 to 0.9, preferably 0.53 to 0.87, and more preferably 0.55 to 0.85.

If the ratio $\alpha$ is less than 0.5, the bond strength of the ferromagnetic metal particles weakens. It is considered that the amount of the binder resin in the surface of the magnetic layer is insufficient, to thereby reduce the strength of the magnetic layer, such that the magnetic layer is readily damaged by the heads or jacket liner.

On the contrary, if the ratio $\alpha$ is more then 0.9, the excess binder is placticized by a lubricant, to thereby reduce the strength of the magnetic layer such that the magnetic layer is readily damaged by the heads or jacket liner.

Examples of the vinyl chloride copolymer for use in the binder resin of the magnetic layer of the magnetic recording medium of the present invention include vinyl chloride polymer, vinyl chloride-vinyl acetate copolymer, vinyl chloride-vinyl propionate copolymer, vinylidene chloride-vinyl acetate copolymer, copolymer of vinyl chloride with vinyl alcohol, maleic acid and/or acrylic acid, vinyl chloride-vinylidene chloride copolymer, and vinyl chloride-acrylonitrile copolymer. The a binder for use in the present invention can further comprise other resins including, for example, ethylene-vinyl acetate copolymer, cellulose derivative such as nitrocellulose resin, acrylic resin, polyvinyl acetal resin, polyvinyl butyral resin, epoxy resin, phenoxy resin, and polyurethane resin.

In the present invention, the vinyl chloride copolymer is used in an amount of preferably from 10 to 100 parts by weight and more preferably from 25 to 35 parts by weight, per 100 perts by weight of the ferromagnetic metal particles.

Preferred among the above described resins are copolymers such as vinyl chloride copolymer, vinyl chloride-vinyl acetate copolymer, vinyl chloride-vinyl propionate copolymer, and vinylidene chloride-vinyl acetate copolymer, containing one or more polar groups selected from the group consisting of $-SO_3M$, $-OSO_3M$, $-PO_3M_2$, $-OPO_3M_2$, and $-CO_2M$ (in which M represents hydrogen, an alkali metal or ammonium) and at least one epoxy ring in the copolymer molecule. Preferred among these polar groups are $-SO_3M$, and $-CO_2M$, more preferably $-SO_3M$. The content of the polar group is preferably in the range of from $1 \times 10^{-7}$ to $1 \times 10^{-3}$ equivalent, more preferably from $1 \times 10^{-6}$ to $1 \times 10^{-4}$ equivalent per g of the vinyl chloride copolymer. When the content of the polar group is outside of this range, the ferromagnetic metal particles exhibit poor dispersibility and greatly deteriorated electromagnetic characteristics. One or more kinds of these polar groups may be used. Two or more different kinds of polar groups can be used. Furthermore, the resin may contain as $-OH$ group to further improve the dispersibility of the ferromagnetic metal particles. The content of the epoxy ring is in the range of from $1 \times 10^{-4}$ to $1 \times 10^{-2}$ mol, preferably from $5 \times 10^{-4}$ to $5 \times 10^{-3}$ mol per g of the vinyl chloride copolymer. The weight-average molecular weight of the resin is in the range of from 20,000 to 100,000, and preferably from 30,000 to 80,000. When the weight-average molecular weight of the resin is outside of this range, the ferromagnetic metal particles exhibit poor dispersibility. The high molecular weight binders described above can be used alone or in combination. A known isocyanate crosslinking agent (e.g., product of the addition reaction of 1 mole of trimethylpropane with 3 moles of tolylene diisocyanate) may be incorporated in the binder as a curing agent. Furthermore, a binder system comprising an acrylic ester-based oligomer and a monomer as a binder curable by exposure to radiation can be used.

A particularly preferred combination of binder resins is a combination of vinyl chloride copolymer, polyurethane resin and curing agent in a weight proportion of 20 to 50; 20 to 50; and 10 to 40, respectively.

The total binder content of the magnetic layer of the magnetic recording medium of the present invention is generally in the range of form 5 to 300 parts by weight, preferably 10 to 100 parts by weight, and more preferably 23 to 36 parts by weight based on 100 parts by weight of the ferromagnetic metal particles.

In the magnetic layer of the magnetic recording medium of the present invention, a lubricant, carbon black, and an abrasive agent are generally incorporated along with the ferromagnetic metal particles and binder resin described above. In addition, an antistatic agent, a dispersing agent, and other additives may be added to the magnetic layer, if desired.

Examples of lubricants that can be incorporated into the magnetic layer of the magnetic recording medium of the present invention include silicone oil, graphite, molybdenum disulfide, boron nitride, graphite fluoride, fluorine-containing alcohols, polyolefins (e.g., polyethylene wax), polyglycols (e.g., polyethylene oxide), alkyl phosphates, polyphenyl ethers, tungsten disulfide, aliphatic esters of monobasic aliphatic acids having 10 to 20 carbon atoms and one or more of monovalent alcohols, divalent alcohols, trivalent alcohols, tetravalent alcohols and hexavalent alcohols, having 3 to 12 carbon atoms, and aliphatic esters of monobasic aliphatic acid containing 10 or more carbon atoms and monovalent to hexavalent alcohols containing a total of 11 to 28 carbon atoms including the aliphatic acid. Furthermore, aliphatic acids having 8 to 22 carbon atoms, aliphatic amides or aliphatic alcohols can be used. Specific examples of useful organic lubricants include butyl caprylate, octyl caprylate, ethyl laurate, butyl laurate, octyl laurate, ethyl myristate, butyl myristate, octyl myristate, ethyl palmiate, butyl palmitate, octyl palmitate, ethyl stearate, butyl stearate, octyl stearate, amyl stearate, anhydrosorbitan monostearate, anhydrosobitan distearate, anhydrosorbitan tristearate, anhydrosorbitan tetrastearate, oleyl oleate, oleyl alcohol, and lauryl alcohol. Furthermore, a lubricating oil additive may also be used alone as the lubricant for use in the present invention. Examples of useful lubricating oil additives include antioxidants (e.g., alkylphenols), rust preventives (e.g., naphthenic acid, alkenylsuccinic acids, and dilauryl phosphate), oiliness improvers (e.g., rape seed oil and lauryl alcohol), extreme pressure additives (e.g., dibenzyl sulfide, tricresyl phosphate, and tributyl phosphite), detergent-dispersing agents, viscosity-index improvers, pour-point depressants, and anti-foaming agents. The above lubricant used as a lubricant is incorporated in an amount of from 0.05 to 20 parts by weight based on 100 parts by weight of binder.

Examples of dispersing agents for use in the magnetic layer of the magnetic recording medium of the present invention include aliphatic acids having 10 to 22 carbon atoms ($R_1COOH$ wherein $R_1$ is an alkyl group having 9 to 21 carbon atoms) such as caprylic acid, capric acid, lauric acid, myristic acid, palmitic acid, stearic acid, oleic acid, elaidic acid, linoleic acid, linolenic acid, and stearolic acid; metallic soaps obtained from the above-described aliphatic acids and metals such as alkali metals (e.g., Li, Na, K), alkaline earth metals (e.g., Mg, Ca, Ba), Cu, and Pb; and lecithin. Additional examples of dispersing agents include higher alcohols containing 4 or more carbon atoms (e.g., butanol, octyl alcohol, myristyl alcohol, stearyl alcohol), and sulfates and phosphates thereof. These dispersing agents may be incorporated into the magnetic layer in an amount of from 0.005 to 20 parts by weight based on 100 parts by weight of binder resin. The method for the incorporation of the dispersing agents is not particularly limited. For example, the dispersing agent may be adhered to the surfaces of the ferromagnetic fine particles or nonmagnetic fine particles prior to addition to the magnetic coating composition, or the dispersing agent may be added during dispersing of the ferromagnetic particles.

Examples of antistatic agents for use in the present invention include electrically conductive powders such as graphite powder, carbon black, and carbon black graft polymer powder; natural surfactants such as saponin; nonionic surfactants such as, e.g., the alkylene oxide type, the glycerin type, or the glycidol type, polyhydric alcohols, esters of polyhydric alcohols, and adducts of alkylphenolethylene oxide; cationic surfactants such as high alkylamines, cyclic amines, hydantoin derivatives, amidoamines, ester-amides, quaternary ammonium salts, heterocyclic compounds including pyridine, and phosphonium or sulfonium compounds; anionic surfactants containing an acid radical such as a carboxylic, sulfonic, or phosphoric acid radical or a sulfate or phosphate radical; and ampholytic surfactants such as amino acids, aminosulfonic acids, esters of sulfuric or phosphoric acid and amino-alcohols, and alkylbetaine-type surfactants.

The abrasive agent for use in the magnetic layer of the magnetic recording medium of the present invention includes materials generally used for abrasion or polishing. Examples of such materials include α-alumina, molten alumina, silicon carbide, chromium oxide, cerium oxide, corundum, artificial diamond, α-iron oxide, garnet, emery (main components: corundum and magnetite), silica, silicon nitride, boron nitride, molybdenum carbide, boron carbide, tungsten carbide, titanium carbide, tripoli, diatomaceous earth, and dolomite. These abrasive agents, which generally have a Moh's hardnesses of 6 or more, may be used alone, or in combination. The abrasive agent has an average grain size of 0.005 to 5 $\mu$m, and preferably from 0.05 to 2 $\mu$m. The amount of the abrasive agent to be incorporated in the magnetic layer is generally in the range of from 1 to 25 parts by weight, preferably 8 to 20 parts by weight based on 100 parts by weight of binder.

Examples of the nonmagnetic support employed in the magnetic recording medium of the present invention include films of various synthetic resins such as polyethylene terephthalate, polycarbonates, polyamides, and polyimides; and metal foils such as aluminum foil and stainless steel foil.

Examples of carbon black for use in the magnetic layer of the present invention include furnace black for rubbers, thermal black for rubbers, coloring black, and acetylene black. These carbon blacks are known in the United States under, for example, the following abbreviations: SAF, ISAF, IISAF, T, HAF, SPF, FF, FEF, HMF, GPF, APF, SRF, MPF, ECF, SCF, CF, FT, MT, HCC, HCF, MCF, LFF, and RCF. Carbon blacks which meet the specifications of ASTM D-1765-82a may be used. The carbon black for use in the present invention has an average particle size of from 5 to 1,000 m$\mu$ (as determined by electron microscopy), a specific surface area of from 1 to 800 m$^2$/g as determined by the nitrogen adsorption method, a pH value of from 4 to 11 (JIS K-6221, 1982), and an oil adsorption of from 10 to 800 ml/100 g as determined with dibutyl phthalate (DBP) (JIS K-6221, 1982). In the present invention, carbon black having a grain size of from 5 to 100 m$\mu$ may be used for reducing the surface electric resistance of a coated film, and carbon black of from 50 to 1,000 m$\mu$ may be used for modifying the strength of a coated film. Furthermore, fine carbon black (100 m$\mu$ or less) may abe used for controlling the surface roughness of a coated film so as to smooth the surface and hence reduce the spacing loss, while coarse carbon black (50 m$\mu$ or more) may be used in combination with other type of carbon black for effectively roughening the surface of a coated film to thereby decrease the friction coefficient.

The magnetic layer of the magnetic recording medium of the present invention has a surface roughness generally of from 0.005 to 0.02 $\mu$m, preferably from 0.005 to 0.015 $\mu$m, as determined in terms of the average center line roughness Ra defined by JIS B 0601 (cut-off value: 0.25 mm).

A magnetic layer of the present invention comprising ferromagnetic metal particles, binder resin, and other components, including carbon black and the above described ester compound, on a nonmagnetic support can be prepared by adding an organic solvent to the above noted ingredients, kneading and dispersing the mixture to prepare a magnetic coating composition, coating the material onto a nonmagnetic support, and then drying the material.

Examples of the organic solvent for use in the preparation of the magnetic coating composition include ketone-type compounds such as acetone, methyl ethyl ketone, methyl isobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, ethyl acetate, butyl acetate, isobutyl acetate, isopropyl acetate, ethyl lactate, and glycol acetate-monoethyl ether; glycol ethers such as ether, glycol dimethyl ether, glycol monoethyl ether, and dioxane; tar compounds (aromatic hydrocarbons) such as benzene, toluene, xylene, cresol, chlorobenzene, and styrene; chlorinated hydrocarbons such as methylene chloride, ethylene chloride, carbon tetrachloride, chloroform, ethylene chlorohydrin, and dichlorobenzene; N,N-dimethylformaldehyde; and hexane.

In the kneading operation, the ferromagnetic particles and the above described remaining ingredients may be introduced into a kneading machine all at once or in succession. For example, the ferromagnetic particles can be added to a solvent containing a dispersing agent, and the resulting mixture is stirred for a predetermined period of time to obtain a magnetic coating composition.

For the kneading and dispersion of the components of the magnetic coating composition, various kneading machines may be used, including a two-roll mill, a three-roll mill, a ball mill, a pebble mill, a Trommel mill, a sand grinder, a Szegvari attritor, a high-speed impeller, a high-speed stone mill, a high-speed impact mill, a disper, a kneader, a high-speed mixer, a homogenizer, and an ultrasonic dispersing device.

Two or more layers may be formed simultaneously on a nonmagnetic support in accordance with the technique of simultaneously applying a plurality of coating films, as shown in T. C. Patton, "Paint Flow and Pigment Dispersion", 1975.

The application of the magnetic coating composition to form a magnetic layer of the magnetic recording medium of the present invention is generally performed to provide a magnetic layer having a thickness of from about 0.5 to 12 μm on a dry basis. If the magnetic layer is to be formed by repeated applications of the coating composition, the total thickness of the plural magnetic layers is maintained within the above range. The dry thickness of the magnetic layer is determined according to the use, shape, standards, etc. of the magnetic recording medium to be produced.

The magnetic coating thus formed on the nonmagnetic support is subjected, if desired, to treatment for orienting the ferromagnetic particles in the coated magnetic layer according to the method described in U.S. Pat. Nos. 4,324,177, 4,466,164, 4,499,121 and 4,100,326 and then dried to provide a magnetic layer. If desired, the thus-obtained recording medium is subjected to surface-smoothing treatment and cut into desired shapes, to thereby obtain the magnetic recording medium of the present invention.

It has been found that the surface-smoothing treatment of the magnetic layer is very effective in the present invention for imparting good surface smoothness and excellent abrasion resistance to the magnetic recording medium. The surface smoothing treatment can be accomplished by smoothing treatment before drying, or by a calendering treatment after drying.

The magnetic recording medium of the present invention exhibits excellent electromagnetic characteristics as well as excellent running durability. Particularly damage to the magnetic layer by the jacket liner is reduced when used as a floppy disc.

The present invention is illustrated in greater detail by reference to the following non-limiting examples and comparative examples. Unless noted otherwise, all parts are given by weight.

EXAMPLE 1

The following compositions were kneaded with a kneader for about 1 hour.

| | |
|---|---|
| Ferromagnetic metal particles | 100 parts |

-continued

| | |
|---|---|
| (Fe content: 99%; Ni content: 1%; crystallite size: 250 Å; coercive force: 1,580 Oe; saturation magnetization: 135 emu/g) | |
| Polar group-containing vinyl chloride copolymer ($-SO_3Na$ group content: $5.8 \times 10^{-5}$ equivalent/g; number-average molecular weight: 75,000) | 14.0 parts |
| $Cr_2O_3$ (average particle diameter: 0.5 μm) | 15 parts |
| Carbon black (Ketjen Black EC, manufactured by Lion Akzo Co., Ltd., Japan; average particle diameter: 30 μm) | 10 parts |
| Carbon black (Thermax MT, manufactured by Cancarp Company; average particle diameter: 280 μm) | 3 parts |
| Toluene | 36 parts |
| Methyl ethyl ketone | 36 parts |

The following compositions were then added to the kneaded material. The mixture was subjected to dispersing treatment for about 2 hours with a sand grinder for 2,000 revolutions to obtain a uniform dispersion.

| | |
|---|---|
| Polar group-containing polyester polyurethane ($-SO_3Na$ group content: $1 \times 10^{-4}$ equivalent/g; weight-average molecular weight: 35,000) | 5.0 parts |
| Methyl ethyl ketone | 250 parts |
| Toluene | 50 parts |

To the dispersion obtained above were added 11 parts by weight of Coronate L (polyisocyanate, manufactured by Nippon Polyurethane Co., Ltd.) and 11 parts by weight of tridecyl stearate. The resulting mixture was homogenized to obtain a magnetic coating composition.

The magnetic coating composition thus obtained was coated on both sides of a polyethylene terephthalate film having a width of 30 cm and a thickness of 75 μm by means of gravure rolls to provide a thickness of 3 μm on a dry basis on each side of the film. The applied coating composition was dried at a temperature of about 100° C. and then calendered at a temperature of about 100° C. to obtain a metal powder-based magnetic recording medium.

The thus-obtained magnetic recording medium was die-cut into the shape of 3.5-inch floppy disc, subjected to polishing treatment on the surface of the magnetic layer with a lapping tape (K-8000, manufactured by Fuji Photo Film Co., Ltd.) for 1.0 second for 1,500 revolutions and then housed in a floppy disc shell employing a No. 9246 liner manufactured by Kendall Company to prepare a floppy disc specimen.

EXAMPLE 2

A floppy disc specimen was prepared in the same manner as in Example 1, except that the polishing of the surface of the magnetic layer with a lapping tape was conducted for 5.0 seconds.

EXAMPLE 3

A floppy disc specimen was prepared in the same manner as in Example 1, except that the polishing of the surface of the magnetic layer with a lapping tape was conducted for 0.5 second.

EXAMPLE 4

A floppy disc specimen was prepared in the same manner as in Example 1, except that the composition of the binder resin in the magnetic layer was as follows:

| | |
|---|---|
| Polar group-containing vinyl choride copolymer | 10.7 parts |
| Polar group-containing polyester polyurethane | 3.8 parts |
| Polyisocyanate | 8.4 parts |

EXAMPLE 5

A floppy disc specimen was prepared in the same manner as in Example 1, except that the composition of the binder resin in the magnetic layer was as follows:

| | |
|---|---|
| Polar group-containing vinyl chloride copolymer | 16.8 parts |
| Polar group-containing polyester polyurethane | 6.0 parts |
| Polyisocyanate | 13.2 parts |

COMPARATIVE EXAMPLE 1

A floppy disc specimen was prepared in the same manner as in Example 1, except that the polishing of the surface of the magnetic layer with a lapping tape was conducted for 10.0 seconds.

COMPARATIVE EXAMPLE 2

A floppy disc specimen was prepared in the same manner as in Example 1, except that the polishing of the surface of the magnetic layer with a lapping tape was conducted for 0.1 second.

COMPARATIVE EXAMPLE 3

A floppy disc specimen was prepared in the same manner as in Example 1, except that the composition of the binder resin in the magnetic layer was as follows:

| | |
|---|---|
| Polar group-containing vinyl chloride copolymer | 7.0 parts |
| Polar group-containing polyester polyurethane | 2.4 parts |
| Polyisocyanate | 5.5 parts |

COMPARATIVE EXAMPLE 4

A floppy disc specimen was prepared in the same manner as in Example 1, except that the composition of the binder resin in the magnetic layer was as follows:

| | |
|---|---|
| Polar group-containing vinyl chloride copolymer | 20.1 parts |
| Polar group-containing polyester polyurethane | 7.2 parts |
| Polyisocyanate | 15.8 parts |

EXAMPLE 6

A floppy disc specimen was prepared in the same manner as in Example 1, except that the ferromagnetic metal particle was replaced with the following ferromagnetic metal particle in an amount of 100 parts by weight.

Ferromagnetic metal particle (Fe content: 99%; Ni content: 1%; crystallite size: 290 Å; coercive force: 1,580 Oe; saturation magnetization: 137 emu/g)

COMPARATIVE EXAMPLE 5

A floppy disc specimen was prepared in the same manner as in Example 1, except that the ferromagnetic metal particle was replaced with the following ferromagnetic metal particle in an amount of 100 parts by weight.

Ferromagnetic metal particle (Fe content: 99%; Ni content: 1%; crystallite size: 380 Å; coercive force: 1,570 Oe; saturation magnetization: 142 emu/g)

The crystallite size of the ferromagnetic metal particle was obtained by the calculation according to Sheller's equation from the half value width of the diffraction of the (110) plane and (220) plane of α-Fe determined by means of X-ray diffractometry (Rigaku K. K.).

Using 3.5-inch floppy disc drive FD-1135D (manufactured by NEC Corporation, Japan), the 3.5-inch floppy disc specimens were subjected to a thermal cycle test under conditions ranging from a temperature of 5° C. and a relative humidity of 10% to a temperature of 60° C. and a relative humidity of 20% with the head positioned at track 13 and 24 hours. The running durability was evaluated in terms of running conditions at the sliding portion of the head after 2,500 passes.

Furthermore, the output of the tracks was evaluated every 500,000 passes. If the output of the specimen decreased to 45% of the initial value, the specimen was regarded as having dropouts.

For the evaluation of electromagnetic characteristics, the initial 2f reproduced output of each specimen was determined relative to that of the specimen of Example 1 as 100%. Also for the evaluation of resolving power, the resolving power of each specimen was determined relative to that of the specimen of Example 1 as 100%. The measurement of the initial 2f reproduced output was accomplished by determining 2f reproduced output of the innermost track by means of a 3.5-inch floppy disc drive FD 1331 (manufactured by NEC Corporation, Japan). The resolving power was determined by dividing the 2f reproduced output of the innermost track by 1f reproduced output of the innermost track as measured by the same drive.

The measurement of the ratio α of the integrated intensity of the Cl-2P spectrum determined by X-ray photoelectron spectroscopy to that of Fe-2P(3/2) determined in the same manner was accomplished by means of an X-ray photoelectron spectroscope (PHI-560, manufactured by PERKIN-ELMER) at 300 W using an Mg anode as an X-ray source. The magnetic disc was washed with n-hexane to remove the lubricant therefrom, and then set in the X-ray photoelectron spectroscope. The distance of the X-ray source and the specimen was 1 cm. After 5 minutes had passed from the evacuation of the vessel to vacuum, the specimen was measured for Cl-2P spectrum and Fe-2P(3/2) spectrum. These measurements were then integrated for 10 minutes with the pass energy maintained at 100 eV.

The ratio α of the integrated intensity of the Cl-2P spectrum to that of the Fe-2P(3/2) spectrum was thus calculated using the above described measurement technique.

The results are set forth in Table 1.

TABLE 1

| | | Electromagnetic characteristics | | Running durability | |
|---|---|---|---|---|---|
| | α | Initial-2f output (%) | Resolving power (%) | Number of Passes | Running Dropout |
| Example 1 | 0.70 | 100 | 100 | 20 million | none |
| Example 2 | 0.53 | 101 | 100 | 20 million | none |
| Example 3 | 0.87 | 100 | 100 | 20 million | none |
| Example 4 | 0.55 | 104 | 99 | 20 million | none |
| Example 5 | 0.85 | 98 | 101 | 20 million | none |
| Comparative Example 1 | 0.40 | 101 | 101 | Scraping at 12 million passes | Observed at 8.5 million passes |
| Comparative Example 2 | 0.95 | 99 | 99 | 20 million | Observed at 8 million passes |
| Comparative Example 3 | 0.35 | 108 | 99 | Scraping at 10 million passes | Observed at 5 million passes |
| Comparative Example 4 | 1.00 | 94 | 101 | 20 million | Observed at 7 million passes |
| Example 6 | 0.73 | 101 | 97 | 20 million | none |
| Comparative Example 5 | 0.74 | 102 | 94 | 20 million | none |

The specimens of Examples 1 to 6, of the present invention, provided good results with respect to both output and running durability.

On the other hand, the specimens of Comparative Examples 2 and 4, each having a ratio α of 0.9 or more, showed relatively good running durability against the sliding with the head up to 20 million passes, but exhibited dropout at 8 million passes and 7 million passes, respectively, due to the damage of the magnetic layer by sliding against the jacket liner.

Further, the specimens of Comparative Examples 1 and 3, each with a ratio α of 0.5 or less, showed scraping at 12 million passes and 10 million passes, respectively, due to damage of the magnetic layer by sliding against the head and dropouts at 8.5 million passes and 5 million passes, respectively, due to damage of the magnetic layer by sliding against the jacket liner.

The specimen of Comparative Example 5, prepared with ferromagnetic metal particles having a crystallite size of more than 300 Å exhibited insufficient resolving power.

While the invention has been described in detail and with reference to specific embodiments thereof, it will be apparent to one skilled in the art that various changes and modifications can be made therein without departing from the spirit and scope thereof.

What is claimed is:

1. A floppy disc comprising a magnetic disc and a jacket having a liner therein for housing the magnetic disc, the magnetic disc comprising a nonmagnetic support having thereon a magnetic layer comprising ferromagnetic metal particles containing at least a substantial amount of Fe and a binder resin having a weight-average molecular weight of from 20,000 to 100,000 and containing at least a vinyl chloride copolymer in an amount of at least 10 parts by weight per 100 parts by weight of the ferromagnetic metal particles, wherein the crystallite size of the ferromagnetic metal particles as determined by X-ray diffraction method is 300 Å or less, and the surface of the magnetic layer is polished with polishing means for a period of time and applied pressure such that the ratio α at the surface of the magnetic layer of the integrated intensity of the Cl-2P spectrum as determined by X-ray photoelectron spectroscopy to that of the Fe-2P(3/2) spectrum is in the range of from 0.50 to 0.90.

2. A floppy disc as in claim 1, wherein said vinyl chloride copolymer contains at least one polar group selected from the group consisting of —SO$_3$M, —O-SO$_3$M, —PO$_3$M$_2$, and —CO$_2$M wherein M represents hydrogen, an alkali metal or ammonium and at least one epoxy ring in the copolymer molecule.

3. A floppy disc as in claim 1, wherein the ratio α is in the range of from 0.53 to 0.87.

4. A floppy disc as in claim 1, wherein the ferromagnetic metal particles have a crystallite size of from 180 to 280 Å.

5. A floppy disc as in claim 1, wherein the ferromagnetic metal particles have a specific surface area of at least 40 m$^2$/g.

6. A floppy disc as in claim 1, wherein the ferromagnetic metal particles have a coercive force of at least 800 Oe and a saturation magnetization of at least 110 emu/g.

7. A floppy disc as in claim 2, wherein the content of the polar group is in the range of from $1 \times 10^{-7}$ to $1 \times 10^{-3}$ equivalent per g of the vinyl chloride copolymer.

8. A floppy disc as in claim 2, wherein the content of the epoxy ring is in the range of from $1 \times 10^{-4}$ to $1 \times 10^{-2}$ mol per g of the vinyl chloride copolymer.

9. A floppy disc as in claim 1, wherein said binder resin comprises a vinyl chloride copolymer, a polyurethane resin and a curing agent in a weight proportion of 20 to 50; 20 to 50; and 10 to 40, respectively.

10. A floppy disc as in claim 1, wherein the binder resin is contained in the magnetic layer in an amount of from 5 to 300 parts by weight per 100 parts by weight of the ferromagnetic metal particles.

11. A floppy disk as in claim 1, wherein the polishing means comprises a lapping tape.

* * * * *